(12) United States Patent
Koehl et al.

(10) Patent No.: US 6,518,396 B1
(45) Date of Patent: Feb. 11, 2003

(54) METHOD FOR INFLUENCING THE OPTICAL PROPERTIES OF POLYMERS

(75) Inventors: Michael Koehl, Britzingen (DE); Franz Brucker, Freiburg (DE)

(73) Assignee: Fraunhofer-Gesellschaft (DE)

( * ) Notice: Subject to any disclaimer, the term of this patent is extended or adjusted under 35 U.S.C. 154(b) by 0 days.

(21) Appl. No.: 09/890,134

(22) PCT Filed: Dec. 29, 1999

(86) PCT No.: PCT/EP99/10462

§ 371 (c)(1),
(2), (4) Date: Jul. 26, 2001

(87) PCT Pub. No.: WO00/44817

PCT Pub. Date: Aug. 3, 2000

(30) Foreign Application Priority Data

Jan. 29, 1999 (DE) .......................... 199 03 632

(51) Int. Cl.⁷ .................................................. C08F 6/00
(52) U.S. Cl. ...................................................... 528/502
(58) Field of Search .......................................... 528/502

(56) References Cited

U.S. PATENT DOCUMENTS

| | | |
|---|---|---|
| 2,260,543 A | 10/1941 | Smith |
| 4,680,138 A | 7/1987 | Sayles, Sr. |
| 5,417,515 A | 5/1995 | Hachey et al. |
| 5,571,362 A | 11/1996 | Hachey et al. |
| 5,697,491 A | 12/1997 | Alex |
| 5,750,191 A | 5/1998 | Hachey et al. |

FOREIGN PATENT DOCUMENTS

| | | |
|---|---|---|
| DE | 36 35 389 A1 | 4/1987 |
| DE | 40 14 164 A1 | 11/1991 |
| DE | 195 17 625 A1 | 11/1996 |
| DE | 694 01 120 T2 | 4/1997 |
| DE | 197 44 018 A1 | 4/1999 |
| DE | 198 56 171 A1 | 6/1999 |
| EP | 0 655 398 B1 | 5/1995 |
| JP | 60 110379 a | 6/1985 |
| WO | 99/18163 A2 | 4/1999 |

OTHER PUBLICATIONS

Database WPI, Section Ch, Week 198611, Derment Publications Ltd., London, GB; AN 1986-071431, XP002137242.

Primary Examiner—Terressa M. Boykin
(74) Attorney, Agent, or Firm—Marshall & Melhorn, LLC

(57) ABSTRACT

The invention relates to a method for influencing the optical properties of polymers wherein pigment particles are embedded in the surface or in regions close to the surface of a polymer or a polymer coating.

13 Claims, 2 Drawing Sheets

METHOD FOR INFLUENCING THE OPTICAL PROPERTIES OF POLYMERS

Figure 1:
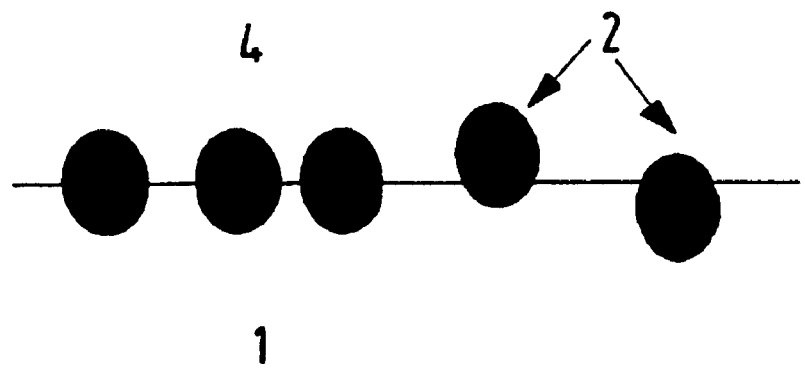

The invention relates to a method for influencing the optical properties of polymers, it being possible for this to involve bodies consisting completely of a polymer, bodies coated with a polymer or other polymer semifinished products. In this process also the corresponding influencing of the properties of polymer films or foils is easily possible. With the invention, the coloration, the luminescence, selective reflection or absorption of specific wavelength ranges of electromagnetic radiation, and here in particular in the wavelength range of visible light, can be influenced.

Usually optical properties, even of polymers, are achieved by for example coloration with pigments which are mixed into the initial material during corresponding manufacturing methods, such as injection moulding or extruding. Here, to produce a corresponding optical impression, e.g. in dyeing, a correspondingly large amount of pigment particles is necessary and these have to be distributed preferably as homogeneously as possible in the polymer material to be influenced. This has an extremely disadvantageous effect in particular with cost-intensive pigments, since in comparison with the optical effect to be achieved, a large amount of such pigment particles is necessary. A large proportion of these pigment particles, however, since they are arranged in the interior of such a polymer structure, can unfold practically no optical effect.

A further alternative for influencing the optical properties of such polymers is the application of a corresponding coating by means of the most varied known methods, such as e.g. PVD, CVD, the sol-gel method amongst others. These known coating methods are in part cost-intensive on account of the high plant costs and secondly there are often adhesion problems with such coatings such that over a longer period of time at least parts of such a coating can flake away and the desired optical effect is subsequently removed again.

It is therefore the object of the invention to propose a possible way of influencing the optical properties of polymers in an inexpensive and permanent manner.

According to the invention, this object is accomplished with the features of claim 1. Advantageous embodiments and developments of the invention arise with the features mentioned in the subordinate claims.

According to the invention, the optical properties of polymers are therefore influenced in that pigment particles adapted to the respective effect to be achieved optically are merely embedded directly into the surface or into regions of a polymer close to the surface, whether this be a polymer body, a polymer semifinished product, a polymer coating, a polymer film or a polymer foil.

Pigments are here intended to include all particles or materials which have an optical effect or can cause an optical effect.

It can be advantageous that, following the embedding of the pigment particles, sealing of the polymer surface is carried out and this should generally not subsequently impair the optical influences desired with the embedding of the pigment particles. In particular transparency should not be influenced.

The solution according to the invention takes into account in particular the fact that the reciprocal action of electromagnetic radiation occurs essentially in the surface region. This relates in particular to luminescence effects to be achieved, such as for example the excitation of fluorescence of photo-sensitisers, direct contact with a fluid on the polymer surface being generally necessary.

The absorption, desirable for many applications, of electromagnetic radiation to protect the polymer or a substrate correspondingly coated with same, has a similar effect in for example counteracting ageing or other undesired material property alteration as a result of heating. Thus for example for the reflection of electromagnetic waves in the wavelength range of infrared light, pigment particles formed from metals are used in order at least to reduce heat radiation losses or the undesired heating already mentioned. Thus for example UV stabilisers can be present merely at the surface and/or in regions close to the surface, such that they can act directly where their effect is required.

Since here merely pigment particles selected according to the desired optical properties to be achieved are embedded directly into the surface or into regions of the polymers close to the surface, in comparison with the conventionally used mixtures of pigment and polymer considerable polymer particle material can be saved and costs reduced.

There are several possible ways of carrying out the method according to the invention. Here the pigment particles can be embedded in a preferably planar surface by means of chemical, mechanical or thermal methods. There is also the possibility of carrying out the embedding with a combination of such methods.

Thus for example a polymer-specific solvent, which itself is known for the various polymers, can be applied to the polymer surface and at least solubilisation of the polymer at the surface or in regions close to the surface can be achieved. In the polymer thus solubilised, the pigment particles can then be embedded, and in some cases already a correspondingly metered scattering of pigment particles in as uniform a distribution as possible can be sufficient. After the evaporation of the solvent, the corresponding pigment particles are surrounded at least partially by the polymer or are held by the polymer with corresponding binding forces such that the desired optical impression can be achieved.

However there is also the possibility of pressing and/or rolling the different pigment particles into the solubilised surface through the action of mechanical forces, which can have a particularly advantageous effect in contours which deviate from flat surface shapes.

A further possibility for the corresponding embedding of pigment particles consists in warming up at least the surface or the region of the polymer close to the surface to such an extent that the softening point of the respective polymer is reached. The pigment particles selected according to the desired optical properties can then be embedded in the softened polymer. The heating can be carried out e.g. by corresponding irradiation or also in an appropriate furnace. The pigment particles are advantageously, in an analogous manner to that described for the solubilisation with suitable solvents, pressed and/or rolled in again. Here the management of the method, i.e. the amount of pigment particles used, the respective pigment particle size, the pressing-in force or the rolling-in depth can be varied in a desired way in order to take into account the optical effect to be achieved.

The hot embossing method known from other areas of technology can also be easily used.

It can be propitious if a microstructure is formed on the polymer surface, into the depressions of which pigment particles are introduced and thereafter the pigment particles embedded in the depressions are sealed by means of thermal, mechanical and/or chemical treatment.

Thus for example a semifinished product formed from a corresponding polymer and provided in advance with a corresponding microstructure or a semifinished product coated with a polymer can be used in which the microstructure is formed e.g. by an embossing method or by injection moulding.

During this process the structural period and depth of the respective size of pigment particles used and/or the desired layer thickness of the pigmented region should be formed. These can be orders of magnitude from nm into the mm range, and corresponding optimisation in respect of the optical effect to be achieved and the polymers or pigment particles used should be undertaken.

With the invention even pigments and substrate materials which are not naturally compatible (e.g. PMMA and hydrophilic pigments) can be correspondingly processed and optical effects achieved. This is in particular the case if the embedding can take place without further additives or solvents.

With the method according to the invention, selected regions of the surface can be correspondingly pigmented such that by this means also an additional characterising optical effect can be achieved. There also exists, in a relatively simple manner, the possibility of excluding specific surface regions from a pigmentation.

Moreover pigment particles formed from different materials and consequently also with differing optical properties and colours can be used both together and separated locally. A variation in the size of the pigment particles used which are embedded locally in different surface regions can also cause specific optical effects. Obviously there is also the possibility of using mixtures of pigment particles in respect of particle material and particle size.

The invention will be explained below by way of example.

Figure 2:
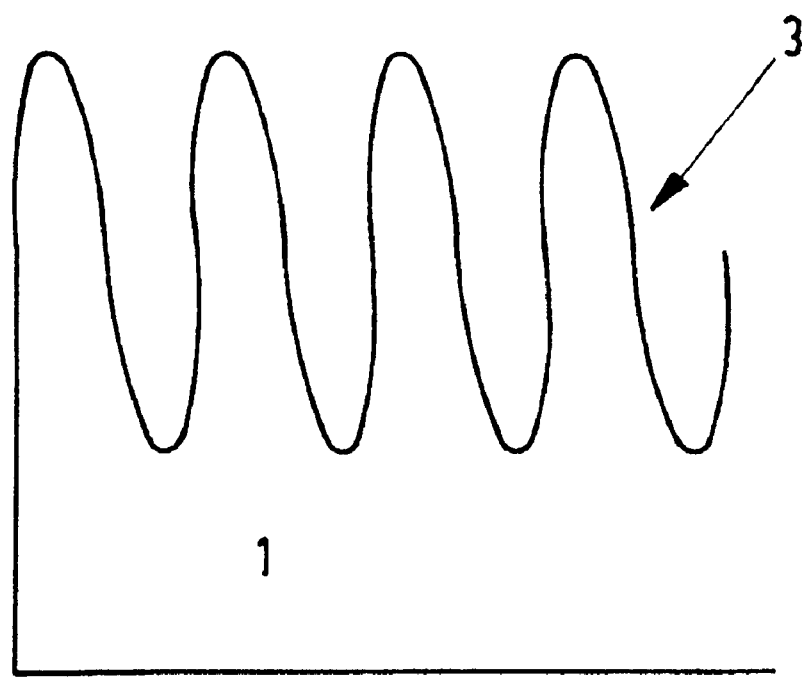
Figure 3:
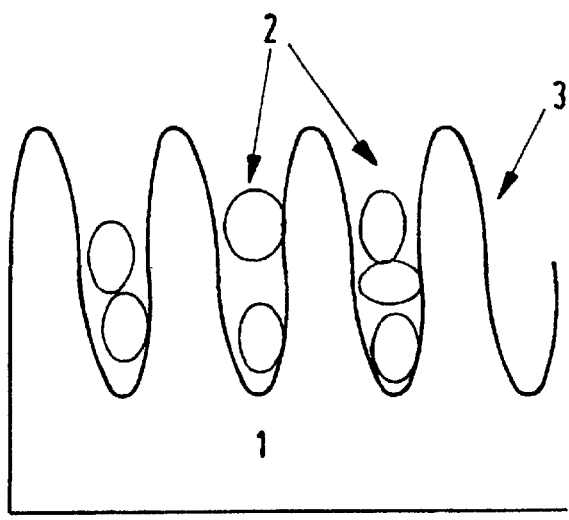
Figure 4:
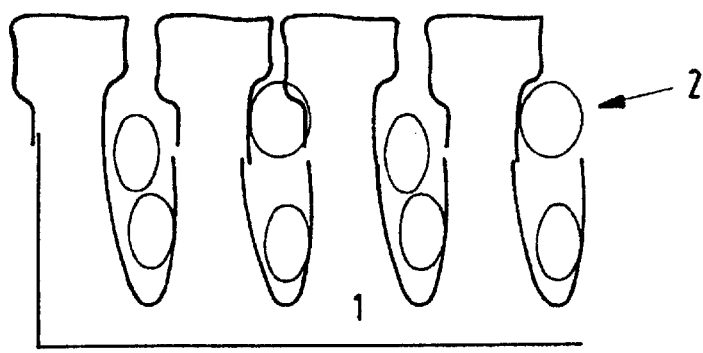

Here the figures show:

FIG. 1 a schematic representation of pigment particles which are embedded in the surface or in the region close to the surface of a polymer;

FIG. 2 a microstructure formed at the surface of a polymer;

FIG. 3 pigment particles introduced into the depressions of the microstructure,

FIG. 4 a partially sealed microstructure containing pigment particles and

Figure 5:
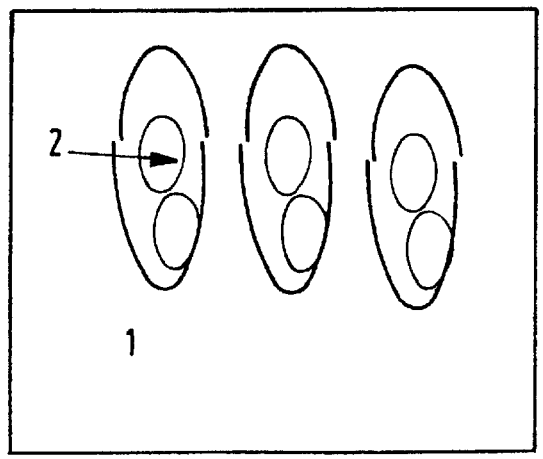

FIG. 5 a completely sealed polymer surface.

In FIG. 1 is represented schematically how pigment particles 2 are embedded in the surface or in regions close to the surface of a polymer 1. Here the embedded pigment particles 2 can have an interaction with a fluid medium 4 which is in direct contact with the pigmented surface, such that particular luminescence effects, such as e.g. excitation or quenching of fluorescence can be exploited.

In FIG. 2 is represented a microstructure 3, which is here formed with a continuous structural period and depth in the surface of the polymer 1. The microstructure 3 can, as already mentioned in the general part of the description, be formed in various manners, it being possible in specific cases also to vary the structural period or the structural depth, in a form not shown here.

Into the depressions of the microstructure 3 can then be introduced correspondingly selected pigment particles 2 with a particle size adapted to the microstructure 3, and subsequently sealing can be undertaken, as shown in FIGS. 4 and 5.

FIG. 4 here shows a partial sealing of the polymer 1 in which the structural depression containing the pigment particles 2 are only partially closed and in such a way that the pigment particles 2 are prevented from falling out. In this case, too, the pigment particles 2 can come into direct contact with a fluid medium 4 and corresponding interactions can occur.

In FIG. 5 is shown how the surface of the polymer 1 provided with embedded pigment particles 2 is completely sealed and consequently also sealed off from the surrounding medium 4.

The sealing, i.e. the partial or complete enclosure of the previously formed microstructure 3 can be achieved by thermal, mechanical or chemical means and by a combination of these possibilities. However in this process there should, as already mentioned initially, be no negative influence on the desired optical properties which are intended to be achieved with the embedded pigment particles 2.

What is claimed is:

1. A method for influencing the optical properties of polymers wherein pigment particles are embedded in the surface or in regions close to the surface of a polymer or a polymer coating, and the surface is sealed.

2. A method according to claim 1, wherein a polymer-specific solvent is applied to the polymer surface and the pigment particles are embedded in the at least solubilized surface region.

3. A method according to claim 1, wherein at least the polymer surface is heated to above the softening temperature of the polymer and thereafter the pigment particles are embedded in the softened region.

4. A method according to claim 3, wherein the polymer particles are embedded by means of hot embossing.

5. A method according to claim 1, wherein the pigment particles are embedded by means of mechanical methods.

6. A method according to claim 5, wherein the pigment particles are pressed and/or rolled in.

7. A method according to claim 1, wherein a microstructure is formed in the polymer surface; pigment particles are introduced into the depressions of the microstructure and the microstructure is sealed by thermal, mechanical and/or chemical treatment enclosing the embedded pigment particles.

8. A method according to claim 7, wherein the microstructure is impressed or formed in an injection molding method.

9. A method according to claim 7, wherein the microstructure is formed with a structural period and/or structural depth adapted to the respective pigment particle size and/or to the respective layer thickness to be pigmented.

10. A method according to claim 1, wherein the pigment particles are embedded in selected surface regions of the polymer.

11. A method according to claim 1, wherein at least two types of pigment particles having differing optical properties are embedded.

12. A method according to claim 1, wherein a pigment particle mixture is embedded.

13. A method according to claim 12, wherein a pigment particle mixture of differing particle size and/or different colors or optical properties is used.

* * * * *